US012508618B2

(12) United States Patent
Wuerfl et al.

(10) Patent No.: US 12,508,618 B2
(45) Date of Patent: Dec. 30, 2025

(54) PRESSURE WASHER WITH ROLL CAGE

(71) Applicant: Black & Decker, Inc., New Britain, CT (US)

(72) Inventors: Ryan Wuerfl, Parkville, MD (US); Brian Poole, Lutherville, MD (US); Anthony Reth, Baltimore, MD (US); Joshua Sheffer, Dover, PA (US); Alexander Nader, Windsor Mill, MD (US); Samuel Eshelman, Fallston, MD (US); David Wheeler, Gananoque (CA); Josephine Arrowsmith, Baltimore, MD (US)

(73) Assignee: BLACK & DECKER INC., New Britain, CT (US)

( * ) Notice: Subject to any disclaimer, the term of this patent is extended or adjusted under 35 U.S.C. 154(b) by 395 days.

(21) Appl. No.: 17/240,250

(22) Filed: Apr. 26, 2021

(65) Prior Publication Data

US 2022/0339655 A1 Oct. 27, 2022

(51) Int. Cl.
*B05B 15/14* (2018.01)
*B05B 9/01* (2006.01)
*B05B 9/08* (2006.01)
*B08B 3/02* (2006.01)

(52) U.S. Cl.
CPC ................ *B05B 15/14* (2018.02); *B05B 9/01* (2013.01); *B05B 9/0861* (2013.01); *B08B 3/026* (2013.01); *B08B 2203/0211* (2013.01)

(58) Field of Classification Search
CPC ....... B05B 9/007; B05B 9/085; B05B 9/0861; B05B 15/14; B08B 3/026; B08B 2203/0211; B65D 9/12; F16M 3/00; B62B 5/065–067; B62B 3/10–108
See application file for complete search history.

(56) References Cited

U.S. PATENT DOCUMENTS

| | | | | |
|---|---|---|---|---|
| 1,214,815 A * | 2/1917 | Morris | B65D 9/12 | 217/69 |
| 3,191,809 A | 6/1965 | Robert et al. | | |
| 4,503,812 A | 3/1985 | Eberhardt | | |

(Continued)

FOREIGN PATENT DOCUMENTS

| | | |
|---|---|---|
| CN | 100544840 C | 9/2009 |
| CN | 204247658 U | 4/2015 |

(Continued)

OTHER PUBLICATIONS

"International Search Report and Written Opinion for PCT Application No. PCT/US2022/026282 filed on Apr. 26, 2022", mailed Sep. 19, 2022, 11 pages.

(Continued)

*Primary Examiner* — Tuongminh N Pham
(74) *Attorney, Agent, or Firm* — Mannava & Kang, P.C.

(57) ABSTRACT

The present invention is directed to a pressure washer having a main housing and a roll cage surrounding the main housing for protection. The roll cage is generally rectangular and provides flat surfaces to make it easier to store the unit, and importantly provides a flat top surface to allow other items to stack on top of the unit. The main housing also includes a storage compartment to store accessories, including a trigger gun. The trigger gun includes a trigger guard with openings to store additional nozzles for the gun.

11 Claims, 14 Drawing Sheets

(56) References Cited

U.S. PATENT DOCUMENTS

| | | | |
|---|---|---|---|
| 4,535,925 A | 8/1985 | Ramey et al. | |
| 5,050,867 A * | 9/1991 | Rand | A63C 19/12 52/6 |
| 5,303,869 A | 4/1994 | Hudson | |
| 5,590,836 A | 1/1997 | Thielbar | |
| 6,189,811 B1 * | 2/2001 | Rudy | F04B 17/006 239/525 |
| D472,519 S | 4/2003 | Buck | |
| D478,042 S | 8/2003 | Yaguchi et al. | |
| D478,311 S | 8/2003 | Yaguchi et al. | |
| 6,651,909 B1 | 11/2003 | Bugarin | |
| D494,929 S | 8/2004 | Imai | |
| 6,817,623 B1 * | 11/2004 | Gerutto | A45C 7/0045 280/37 |
| D501,182 S | 1/2005 | Buck | |
| 6,854,663 B2 | 2/2005 | Bugarin | |
| D504,663 S | 5/2005 | Buck | |
| 6,902,356 B2 | 6/2005 | Breitenmoser | |
| 6,935,642 B1 | 8/2005 | Craig et al. | |
| D509,795 S | 9/2005 | Buck | |
| 6,988,677 B2 | 1/2006 | Sodemann et al. | |
| D581,868 S | 12/2008 | Imai | |
| D629,748 S | 12/2010 | van Deursen | |
| 7,891,036 B2 | 2/2011 | Hahn et al. | |
| D641,318 S | 7/2011 | Maeda | |
| D644,174 S | 8/2011 | Fujiki | |
| D644,993 S | 9/2011 | van Deursen | |
| D668,607 S | 10/2012 | van Deursen | |
| D675,984 S | 2/2013 | Shokrzadeh et al. | |
| 8,398,097 B2 | 3/2013 | Junk et al. | |
| D688,628 S | 8/2013 | van Deursen | |
| D688,841 S | 8/2013 | van Deursen | |
| 8,602,323 B2 | 12/2013 | Bearup et al. | |
| D703,137 S | 4/2014 | van Deursen | |
| 8,727,233 B2 | 5/2014 | Karp | |
| 8,783,587 B2 | 7/2014 | Bearup et al. | |
| D795,191 S | 8/2017 | Wang | |
| D797,046 S | 9/2017 | Wang | |
| D813,474 S | 3/2018 | Holtby et al. | |
| D828,301 S | 9/2018 | Wang | |
| D834,269 S | 11/2018 | Masters | |
| 10,293,383 B2 | 5/2019 | Krauter et al. | |
| 10,500,631 B2 | 12/2019 | Yuan | |
| 10,799,899 B2 | 10/2020 | Schuetz et al. | |
| 2005/0191187 A1 * | 9/2005 | Vos | B62B 1/125 417/572 |
| 2006/0108449 A1 | 5/2006 | Sodemann et al. | |
| 2006/0196967 A1 | 9/2006 | Monty | |
| 2011/0089265 A1 | 4/2011 | Gilpatrick et al. | |
| 2014/0263754 A1 | 9/2014 | Nushart et al. | |
| 2015/0224547 A1 | 8/2015 | Butler | |
| 2017/0304873 A1 | 10/2017 | Luby et al. | |
| 2018/0021800 A1 | 1/2018 | Janik | |
| 2018/0133729 A1 | 5/2018 | Masters | |
| 2019/0009309 A1 | 1/2019 | Rickey et al. | |
| 2019/0299234 A1 | 10/2019 | Schuetz et al. | |

FOREIGN PATENT DOCUMENTS

| | | |
|---|---|---|
| CN | 205550946 U | 9/2016 |
| CN | 206144666 U | 5/2017 |
| CN | 106925553 A | 7/2017 |
| CN | 206731633 U | 12/2017 |
| CN | 207887396 U | 9/2018 |
| CN | 108746023 A | 11/2018 |
| CN | 110756722 A | 2/2020 |
| DE | 202005019979 U1 | 4/2006 |
| DE | 202006007167 U1 | 6/2007 |
| EP | 1829622 A2 | 9/2007 |
| EP | 2314398 B1 | 4/2019 |
| GB | 2559359 B | 7/2019 |
| WO | 2006/099954 A1 | 9/2006 |
| WO | 2006113072 A2 | 10/2006 |
| WO | 2018/095207 A1 | 5/2018 |

OTHER PUBLICATIONS

"Supplementary Partial European Search Report for EP Application No. 22796529.0", European Patent Office, mailed Feb. 26, 2025, 24 pages.

* cited by examiner

PRESSURE WASHER WITH ROLL CAGE

FIELD OF THE INVENTION

This application is directed to a compact pressure washer with a roll cage frame for durability. The pressure washer also includes a trigger guard with storage for additional nozzles.

BACKGROUND OF THE INVENTION

This section provides background information related to the present disclosure which is not necessarily prior art.

Traditional pressure washers are often bulky machines that come in uneven and irregular shapes. They typically store their accessories externally, making the unit even larger, bulkier, and more prone to unintentional damage to the accessories. Their shape and size make them difficult to store without taking up a large amount of space. Traditional pressure washers also do not provide a means for protection against harmful, extreme environments, or abusive transportation.

BRIEF SUMMARY OF THE INVENTION

This section provides a general summary of the invention and is not a comprehensive disclosure of its full scope or all of its features.

In accordance with one aspect of the invention, the present invention has a main housing, surrounded by a protective roll cage. The roll cage is a multifunctional component of the pressure washer, not only preventing the unintentional damage to the main housing, but allowing for many of the features of the pressure washer to reside in a small, compact volume. The main housing holds all the operating components of the pressure washer, and further includes a storage compartment for accessories such as wands, a trigger gun, and nozzles.

The roll cage also supports the versatile storage of the pressure washer due to its flat rectangular shape. The unit can be stored horizontally or vertically, or stacked on top or beneath other products. This make storage of the unit simpler, especially when storing with other objects.

In another aspect of the invention, the pressure washer includes a trigger gun for directing the operation of the pressure washer. The trigger gun includes a trigger guard capable of storing different nozzles used with the trigger gun.

Further areas of applicability will become apparent from the description provided herein. The description and specific examples in this application are intended for purposes of illustration only and are not intended to limit the scope of the present disclosure.

BRIEF DESCRIPTION OF THE INVENTION

Further features and advantages of the present invention will be better understood by reference to the following description, which is given by way of example and in association with the accompanying drawings, in which.

DETAILED DESCRIPTION OF THE INVENTION

Figure 1:
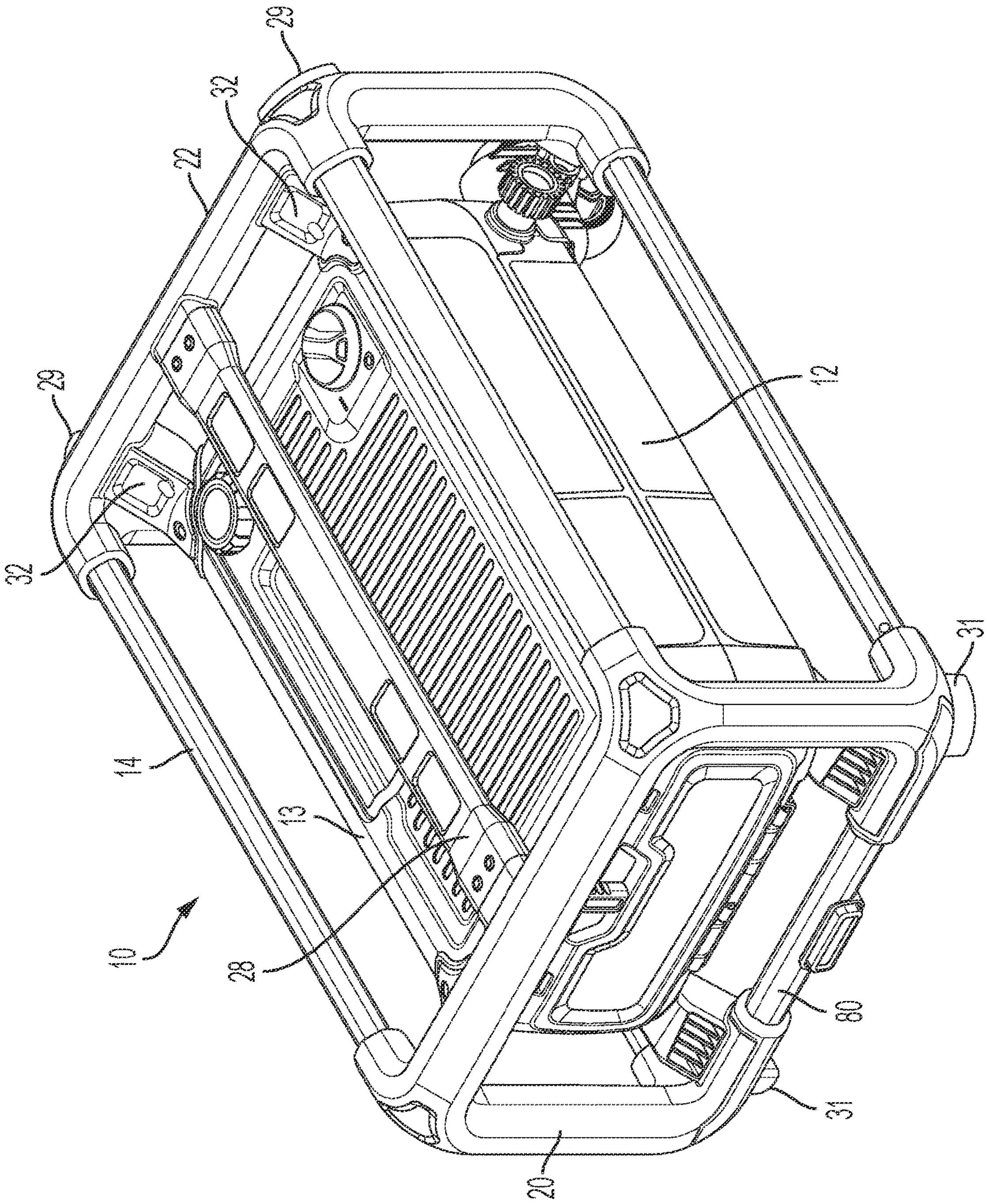
FIG. 1 is a front perspective view of a pressure washer of the present invention.
Figure 2:
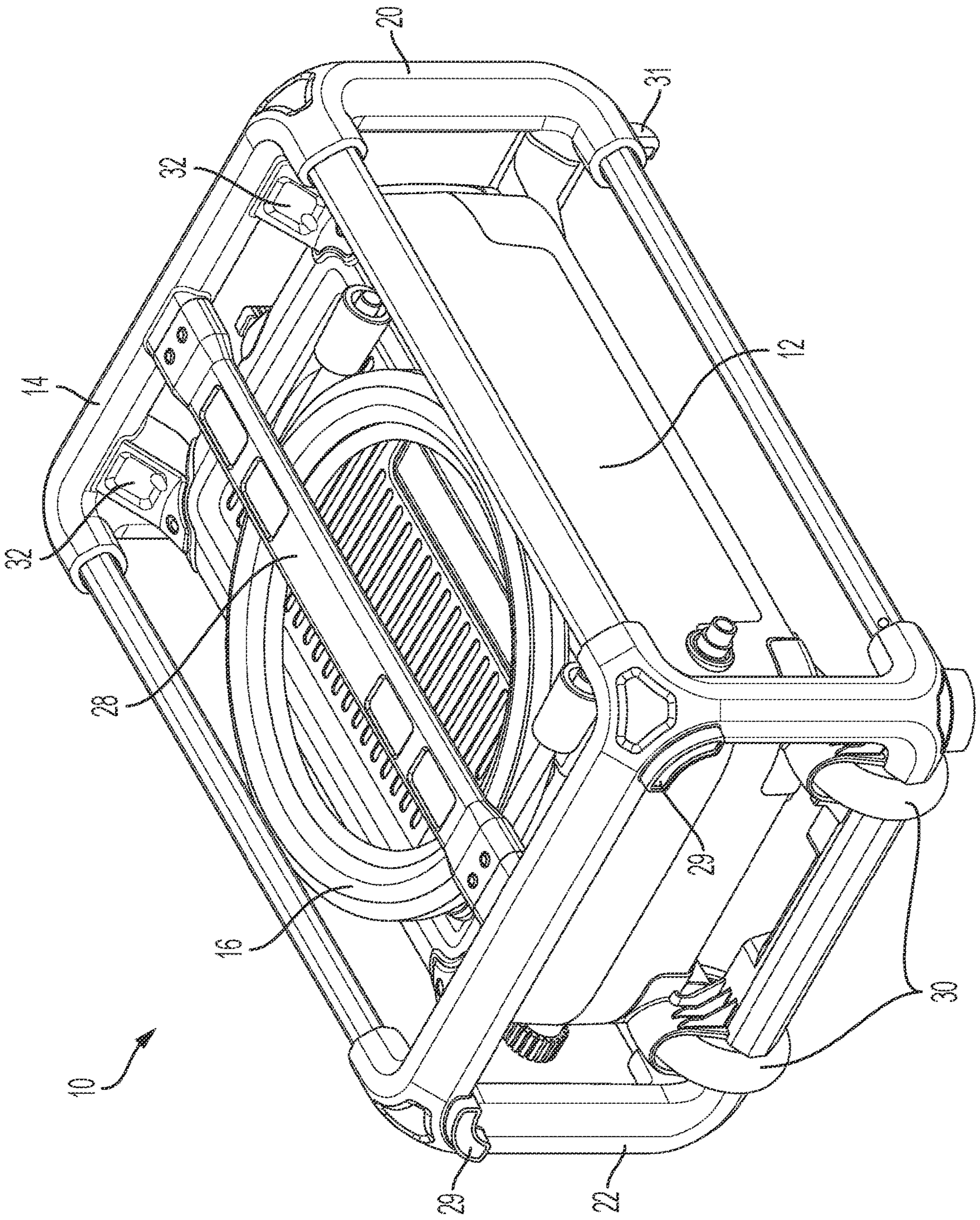
FIG. 2 is a rear perspective view of the pressure washer of FIG. 1.

The present invention is directed to a compact pressure washer that's durable and easy to store. With reference to FIGS. 1 and 2, the pressure washer 10 includes a main housing 12 surrounded by a generally rectangular shaped roll cage 14. FIG. 1 shows a top front view while FIG. 2 is a top rear view.

Figure 3:
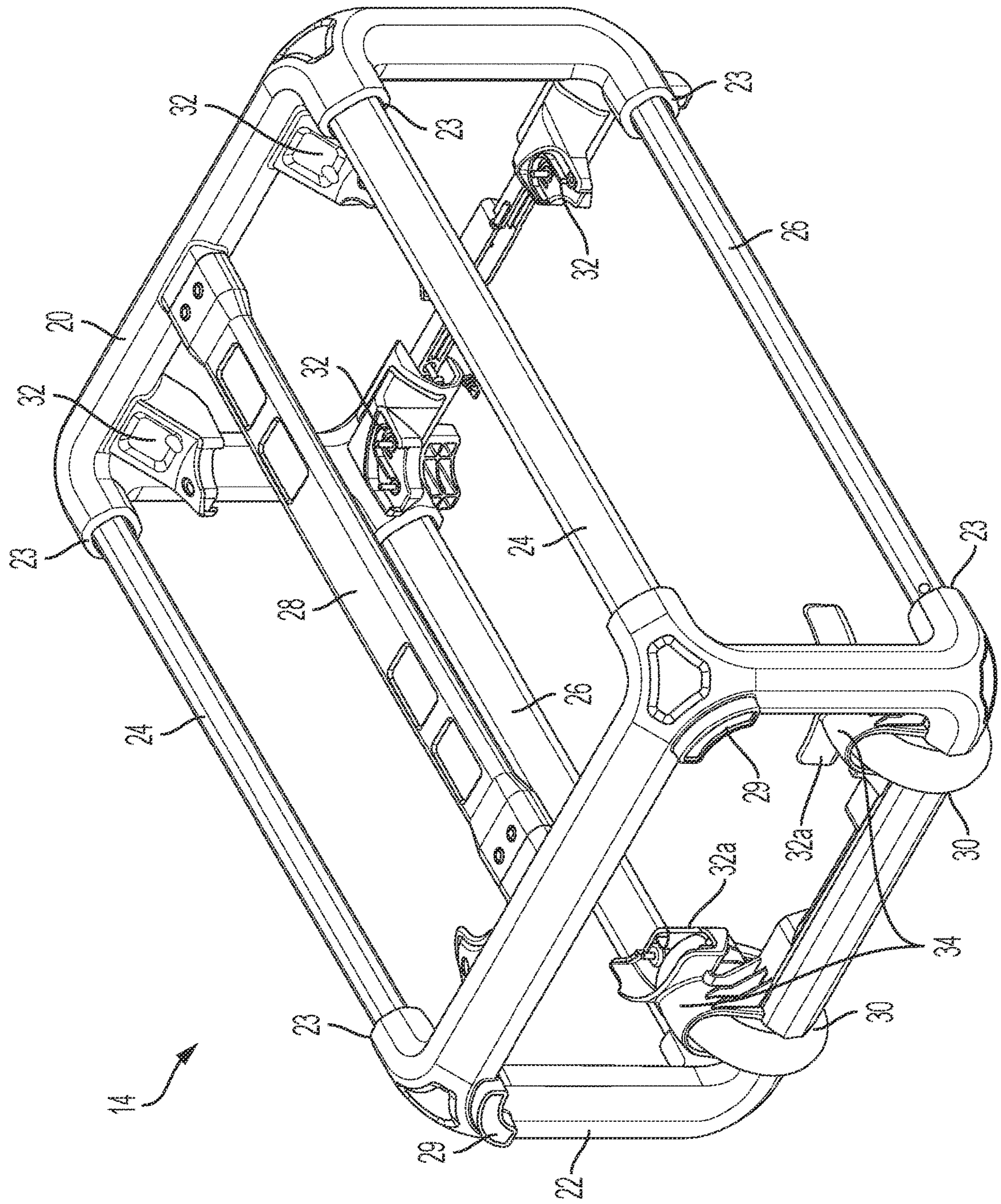
FIG. 3 is the roll cage of FIG. 2.

FIG. 3 shows the roll cage 14 without the main housing 12 for clarity. The roll cage 14 has a front end face 20 and a rear end face 22 connected by two top bars 24 and two bottom bars 26. The corners of the end faces 20 and 22 include openings 23 into which the bars 24 and 26 are inserted to form the roll cage. An additional handle bar 28 extends the length of the roll cage, and in addition to providing greater rigidity, acts as a convenient handle for lifting or otherwise grabbing the pressure washer. Furthermore, the bars 24 and 26, and the cross bars of the end faces 20 and 22 provide additional gripping surfaces, providing the user with multiple grab points that allow the pressure washer to be easily handled and transported.

Figure 14:
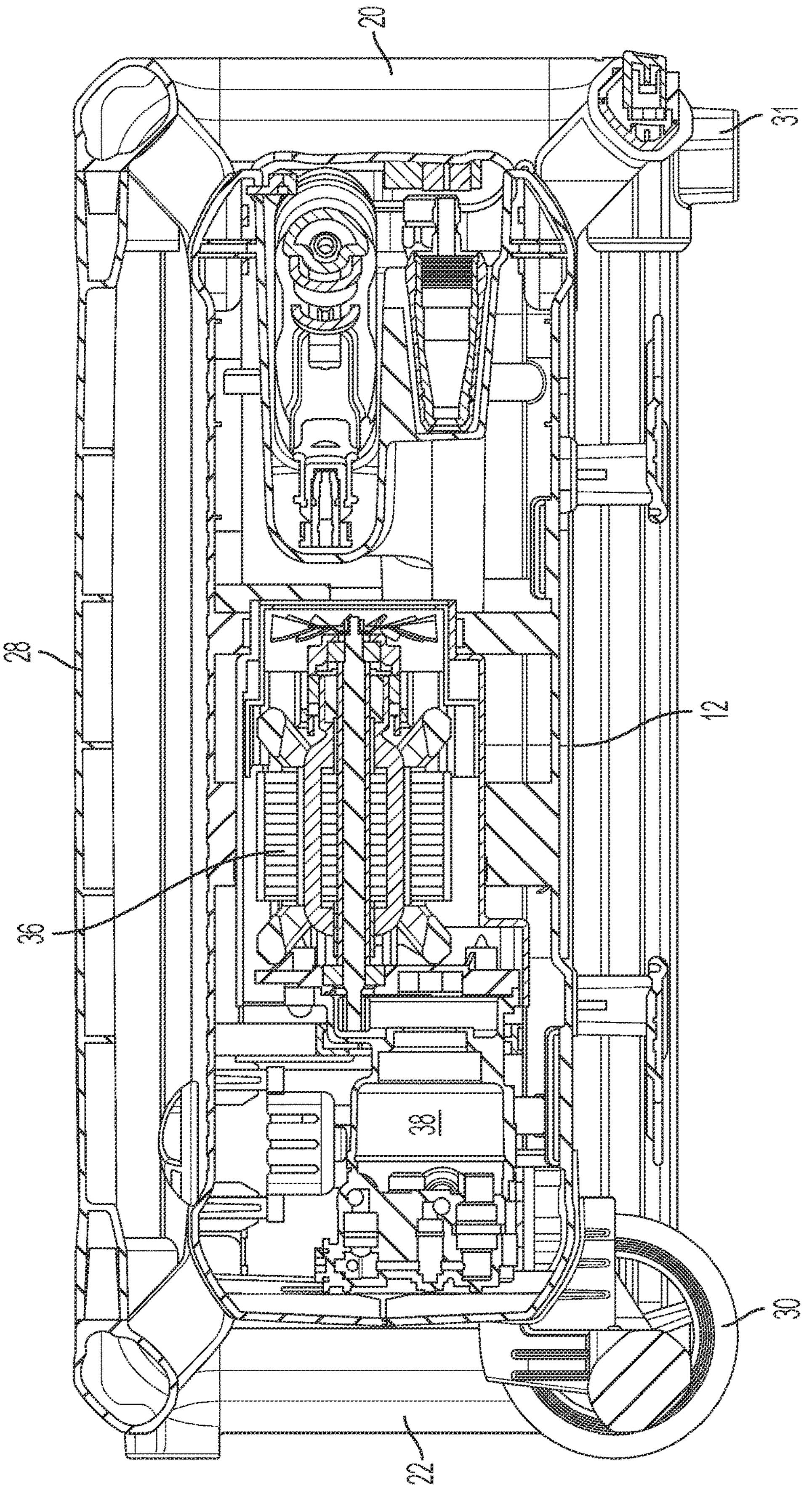
FIG. 14 shows a side sectional view of the pressure washer.

Referring to FIGS. 2 and 14, the space between the handle bar 28 the housing 12 is sized to securely hold a hose 16 in place. The spacing is determined to frictionally hold the hose 16 while also being flush with the top surface of the roll cage 14, as best shown in FIG. 14. In the present invention, the dimension from the housing 12 to the handle bar 28 is 38.7 mm, but it should be understood that this dimension is dependent upon multiple factors, including the hose diameter, handle thickness, etc. and the important feature is that the hose 16 be secured in place by the handle bar 28, while be flush with the top surface of the roll cage.

Figure 8:
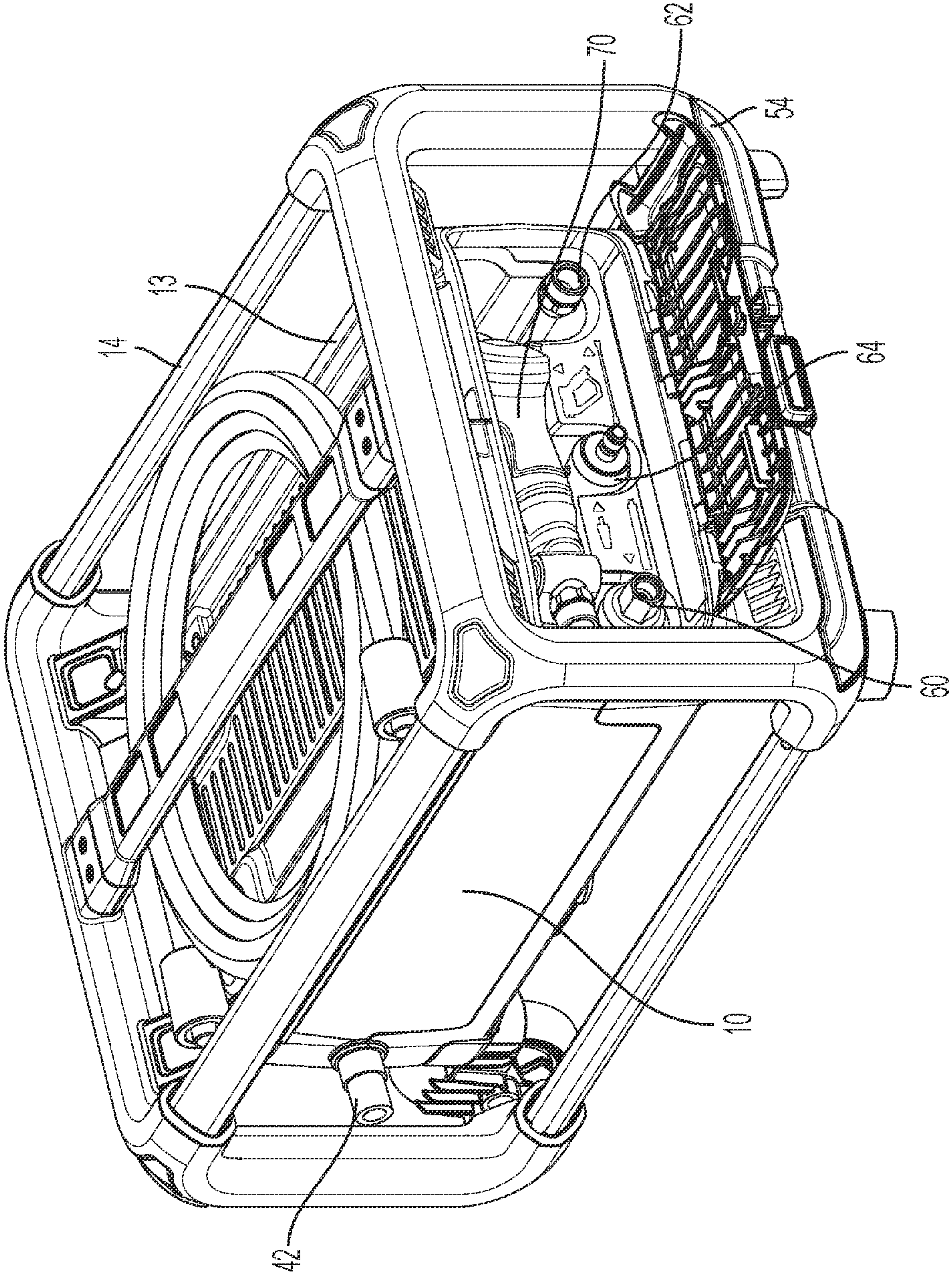

Also, as shown in FIGS. 1, 2 and 8, the outer perimeter of the top of the housing 12 has a heightened wall 13 that creates a well or concavity at the center of the housing. When the hose 16 is then placed under the handle bar 28, it is forced into the well by the handle bar 28 so that is sits securely in the well. The top bars 24 of the roll cage further help to secure the hose 16 in place.

Importantly, all this is done while maintaining the uniform shape of the roll cage/pressure washer by keeping the handle bar 28 flush with the other frame members of the roll cage 14. This allows other objects to be stacked on top (or sides) of the roll cage for easy storage.

Referring again to FIGS. 1-3, the roll cage 14 is secured to the main housing 12 through brackets 32 at the corners of both end faces 20 and 22. The rear end face 22 includes a pair of wheels 30 that allow the pressure washer to be rolled across a surface, and the bottom brackets 32*a* on the rear end face 22 are formed on wheel covers 34. Opposite the wheels 30 on the front end face 20 are a pair of feet 31 that support the roll cage 14 in its horizontal position. A pair of additional feet 29 are on the rear end face 22 opposite the wheels to support the roll cage in a vertical position.

Figure 4:
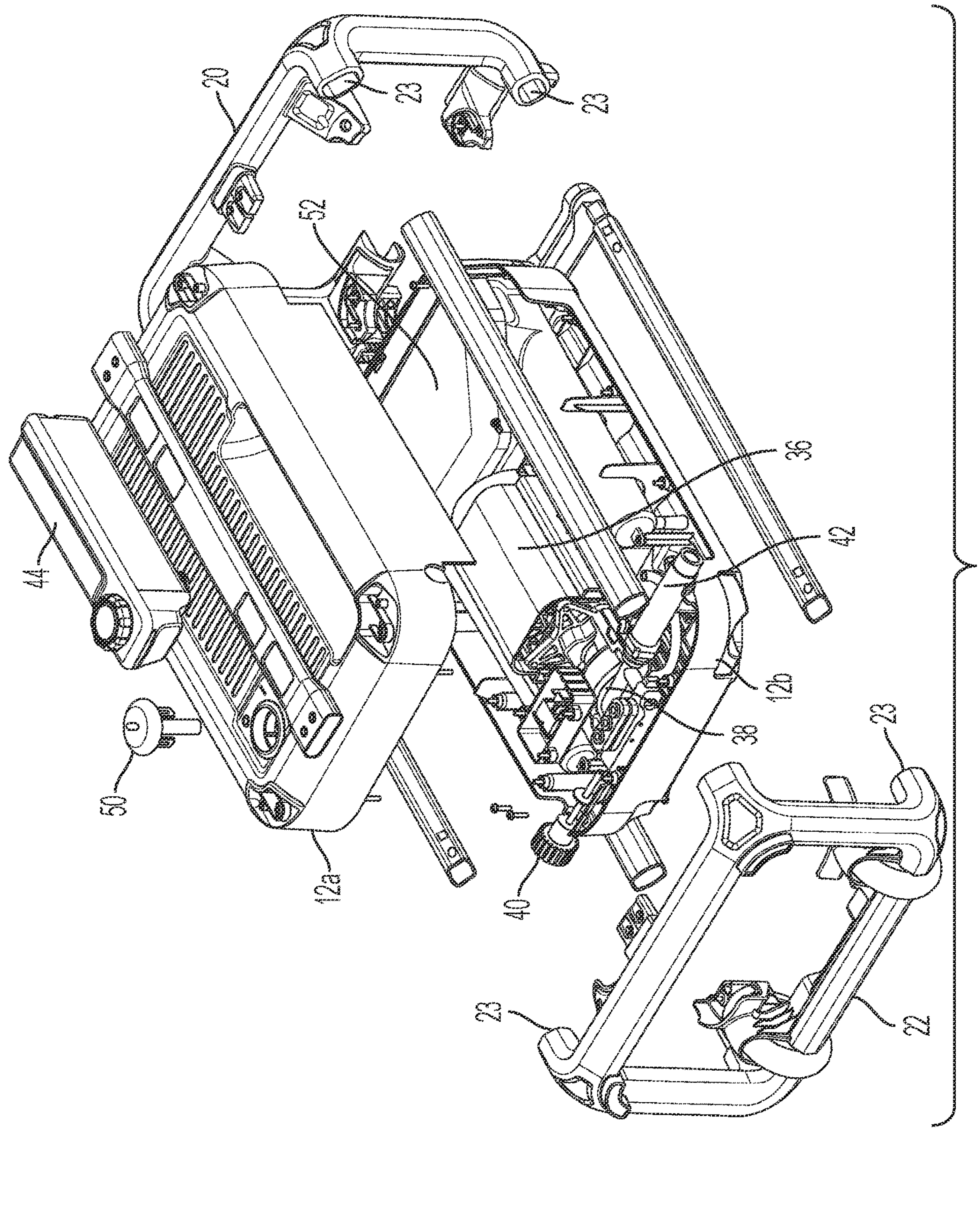
FIG. 4 is an exploded view of the pressure washer.
Figure 5:
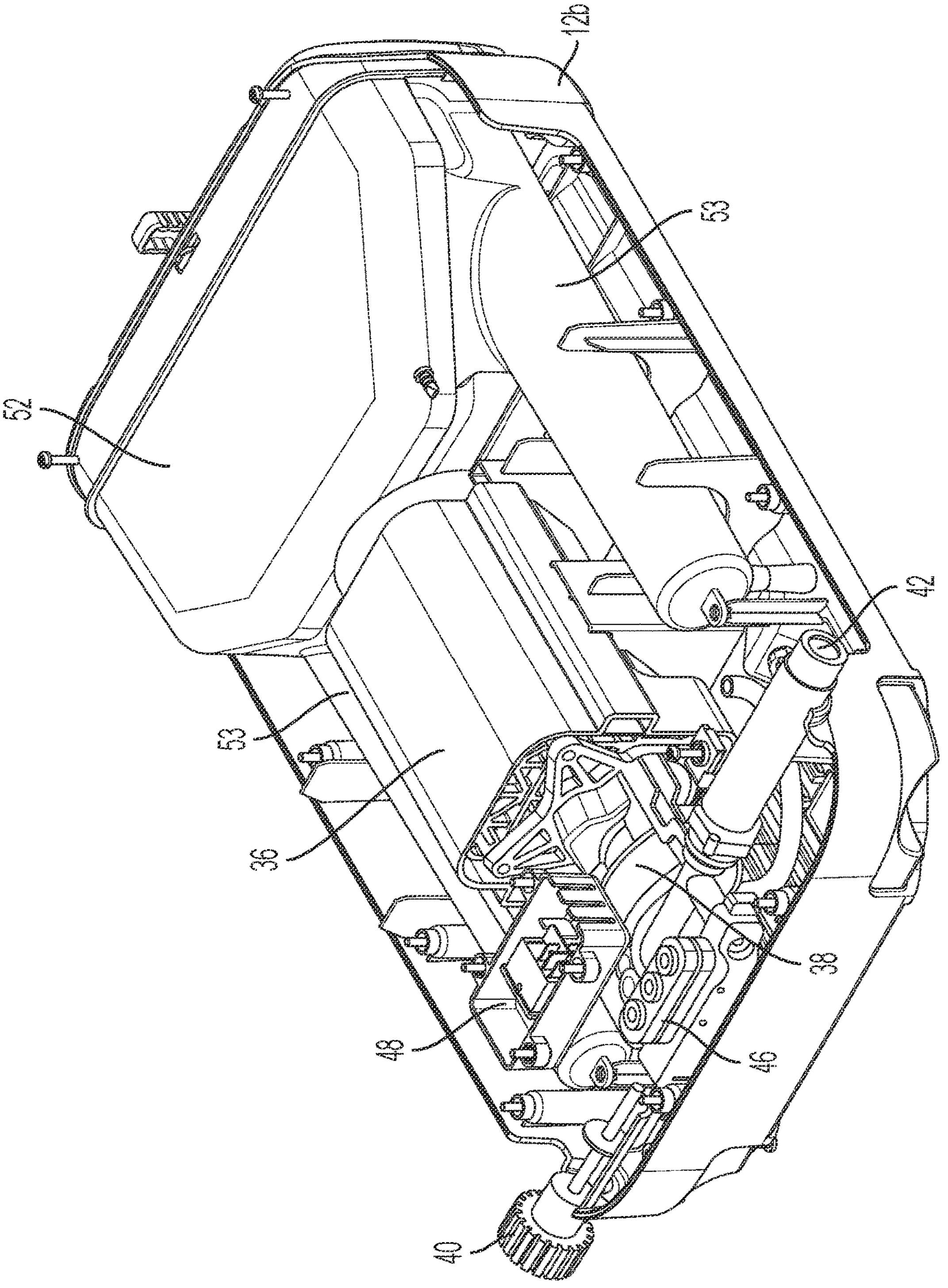
FIG. 5 is an interior view of the main housing.

Referring now to FIGS. 4 and 5, the main housing 12 will be described. The main housing 12 is formed from two clamshell housing halves 12*a* and 12*b*, which hold the working components of the pressure washer, including a motor 36 and pump 38. A water inlet 40 is located at one side of the housing for connection to garden hose or other water source, and a water outlet 42 is located on an opposite side for connection to the high pressure hose 16, which connects to a trigger gun 70.

A soap dispenser 44 is stored within the top housing 12*a*. The soap dispenser holds cleaning solution and provides it to a manifold 46 which mixes the solution with the water flow before exiting through the outlet 42.

A switch assembly 48 is located adjacent the motor 36 and pump 38. The switch assembly 48 is preferably a rocker switch, but can be any type of on/off switch. A knob 50 is positioned on the top housing 12*a* and its underside includes a rib which contacts the switch assembly 48. As a user rotates the knob 50 between the on and off position, the switch assembly 48 is switched between its on and off position.

Figure 6:
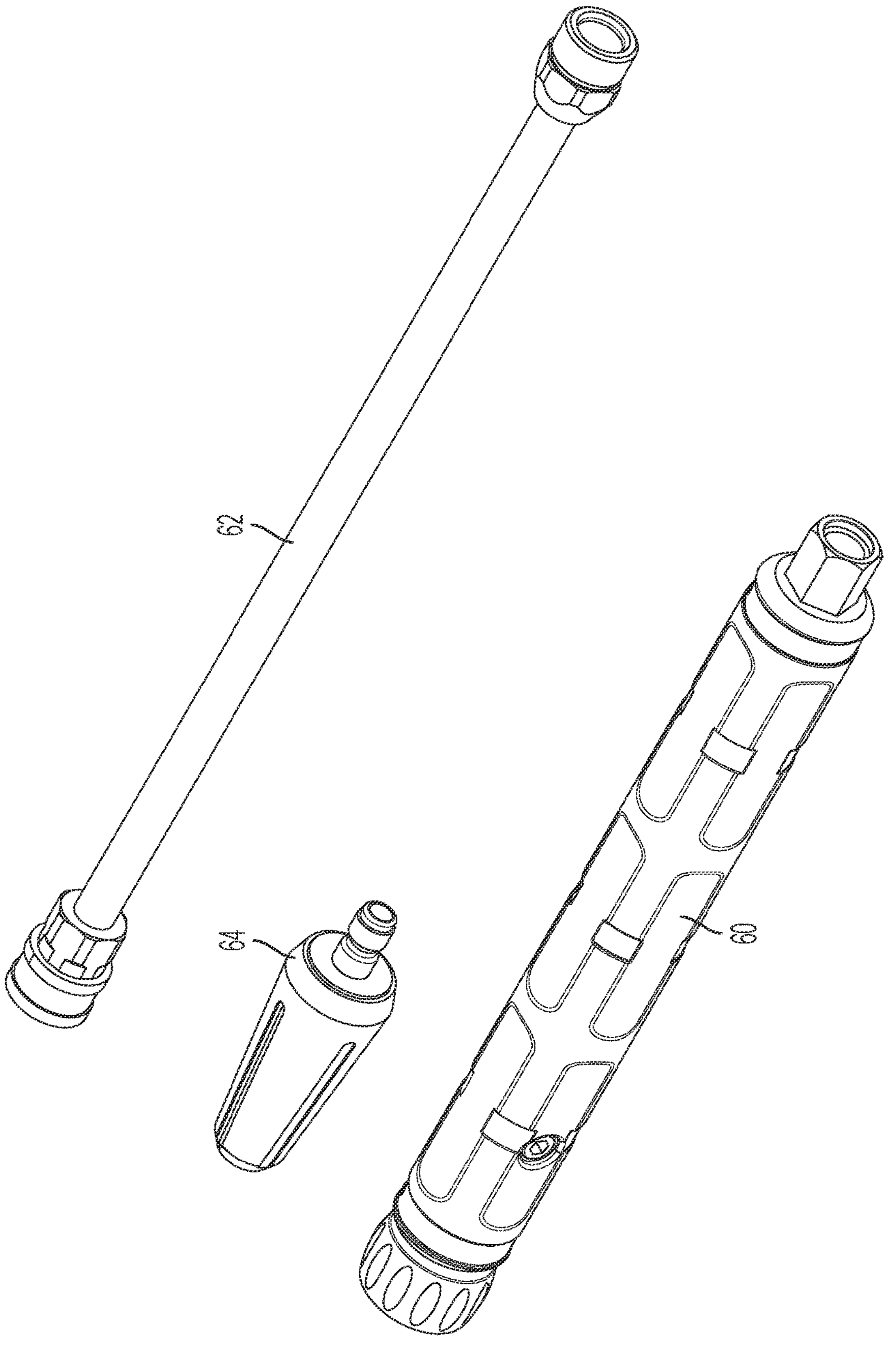
FIG. 6 shows the accessories for the pressure washer.
Figure 7:
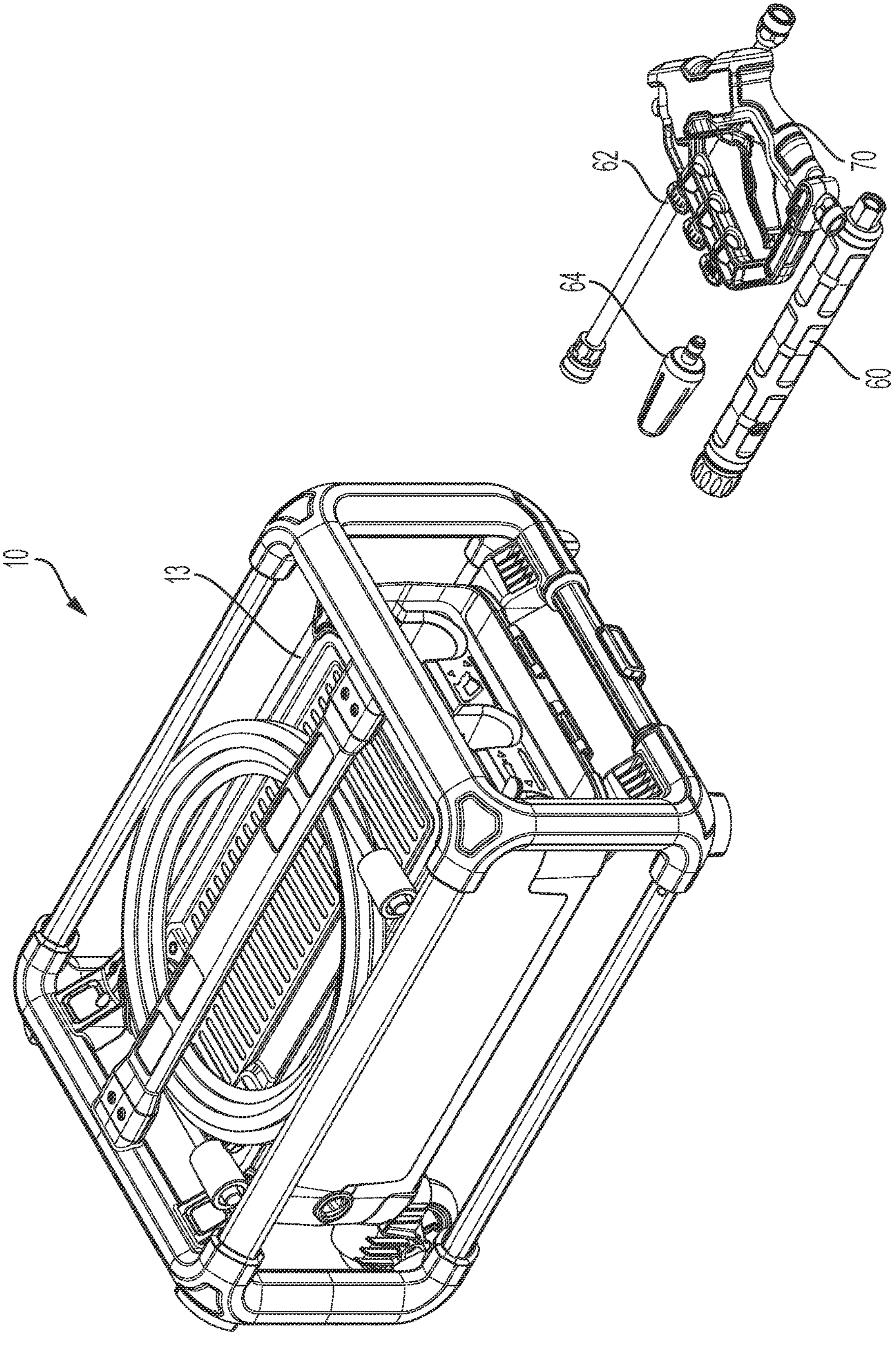
FIGS. 7 and 8 show the accessories before and after storage in the main housing.

As can best be seen in FIG. 5, most of the operating components are located in a rear portion of the housing 12, with a storage bin 52 placed in a front portion. The storage bin 52 holds various accessories for the pressure washer, including different types of wands and nozzles. For example, FIG. 6 shows a gripping wand 60, a standard wand 62, a turbo nozzle 64 and the trigger gun 70, all of which can be stored within the storage bin 52 as shown in FIGS. 7 and 8. FIG. 8 shows a door 54 that closes the storage bin 52 to retain and protect the accessories therein. It should be noted that the door 54 has been removed from the other figures solely for clarity, and the present invention is intended to incorporate the door 54. Furthermore, the storage bin is shaped to accommodate the accessories, as shown for example, in FIG. 5. Therefore, the storage bin 52 includes arms 53 on both sides of the motor that are capable of holding the wands 60 and 62.

Figure 9:
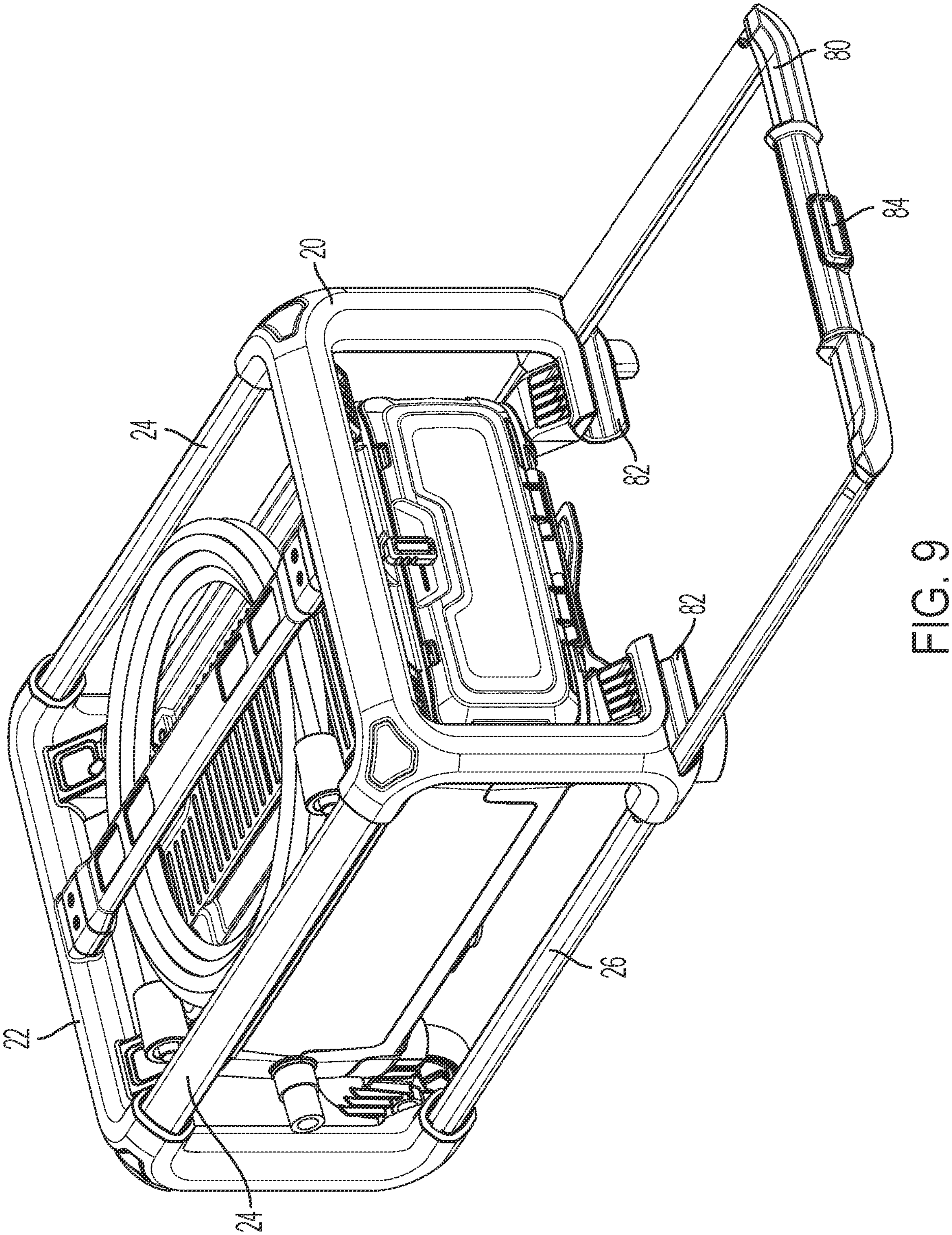
FIG. 9 shows the telescoping handle is an extended position.

Referring to FIG. 9, the roll cage 14 also includes a telescoping handle 80 that forms the bottom cross bar on the front end face 20. The end face 20 includes open channels 82 that hold the handle 80 when retracted, and a button 84 to lock and release the handle 80.

It is important to note that the main housing 12 and all the other associated components of the pressure washer including the soap dispenser 44, water inlet 40, water outlet 42 and accessories are all contained within the roll cage frame 14. This reduces the likelihood of damage to the unit, especially from drops and other accidents.

Figure 10:
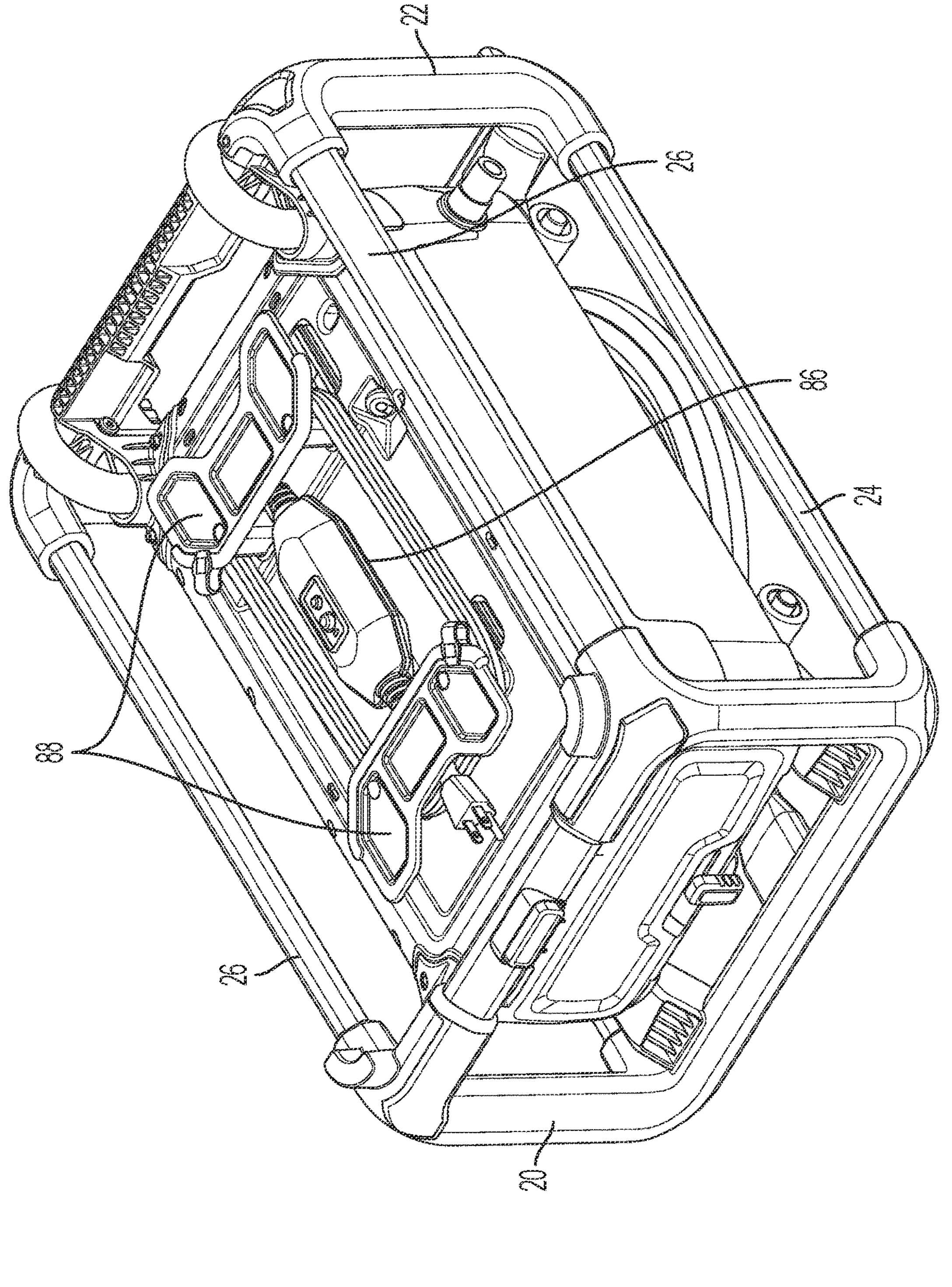
FIG. 10 is a bottom view of the pressure washer.

The pressure washer of the present invention is an AC unit with a power cord 86 as shown in FIG. 10. The cord is wrapped around posts 88 for easy storage. Although the pressure washer is shown as an AC unit, the features described in the present invention could be applied to a battery powered electric unit, a gas unit, or any other power source.

Figure 11:
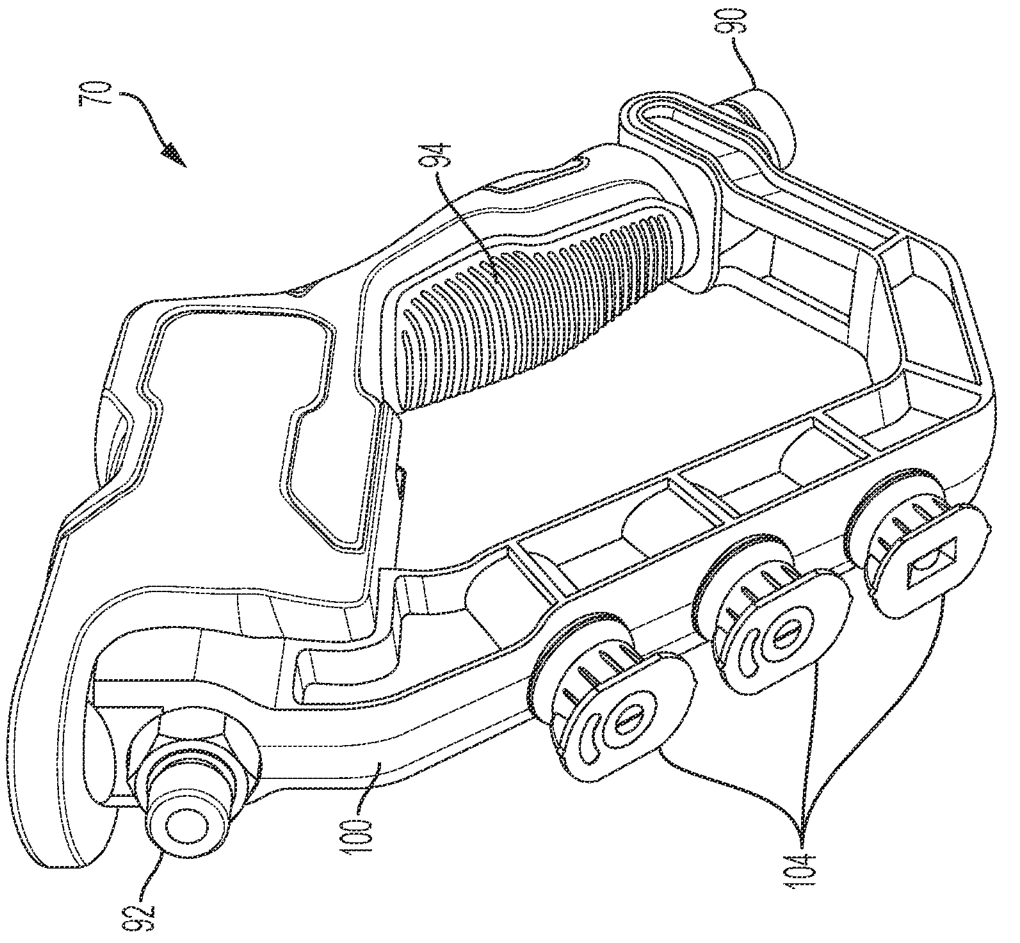
FIGS. 11-13 show the trigger gun for use with the pressure washer.
Figure 12:
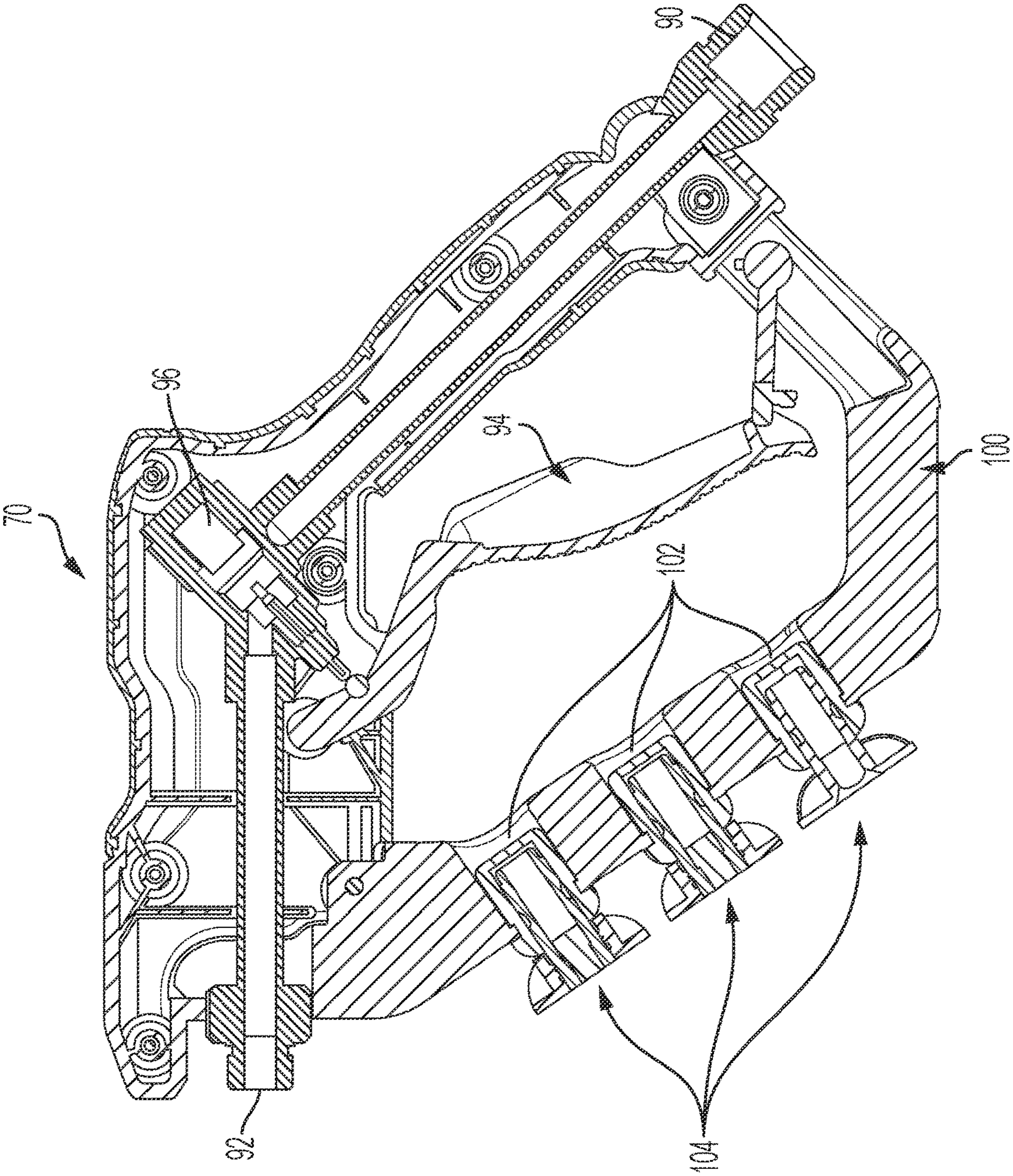
Figure 13:
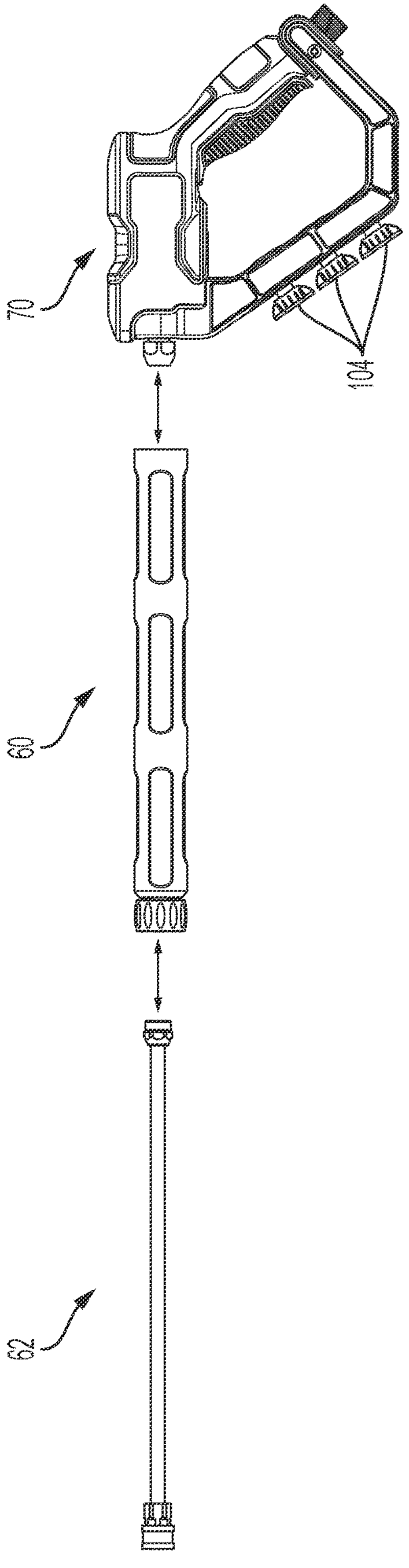

Referring now to FIGS. 11 and 12, which show the trigger gun 70. The gun includes a trigger 94 (in FIG. 11, the trigger is shown in the retracted position) and a water inlet 90 that's connected to the outlet 42 of the pressure washer by the hose 16. An outlet 92 of the gun is connected to accessories, such as those stored in the storage bin 52. FIG. 13 shows an example of how the wands are connected to the trigger gun 70, with gripping wand 60 and standard wand 62 attached to the trigger gun 70. Various nozzles can be attached at the end of the wand 62 for different spray profiles as desired. The trigger 94 is connected to a valve 96 to control the actuation of the water flow, however different valve designs can be incorporated to control water flow rate and/or water pressure if needed.

A trigger guard 100 is placed surrounding the trigger 94 to protect it from damage and reduce the chances of accidental actuation. The guard 100 includes several openings 102 for holding additional nozzles for the pressure washer. The openings 102 include grommets which frictionally hold the nozzles 104. Pressure washers typically come with multiple nozzle having different performance profiles which are selected depending on the job being performed. Traditional pressure washers typically store these extra nozzles on the main body of the unit, making it inconvenient for the user to switch nozzles. Locating the extra nozzles on the trigger gun itself, allows for a quick and easy means for storing and accessing different nozzles when needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure

The invention claimed is:

1. A pressure washer comprising:

a main housing holding a motor and a pump, and including a water inlet to allow water to enter the main housing and a water outlet to allow the water to exit the main housing;

a roll cage having a generally cuboid shape surrounding all sides of the main housing so that the main housing is entirely contained within a perimeter of the roll cage, wherein the roll cage includes:

a front end face having four corners, a rear end face having four corners, two top bars connecting two top corners of the front end face and two top corners of the rear end face, two bottom bars connecting two bottom corners of the front end face and two bottom corners of the rear end face, a pair of wheels attached to the two bottom corners of the rear end face, and an extendable handle attached to the two bottom corners of the front end face and inserted inside the two bottom bars, wherein, when the extendable handle is retracted into the two bottom bars, a cross bar of the extendable handle forms a bottom edge of the front end face, and when the extendable handle is extended from the two bottom bars, the extendable handle allows the pressure washer to be pulled and rolled on the pair of wheels that are attached to the two bottom corners of the rear end face.

2. The pressure washer of claim 1, wherein the water inlet and the water outlet are contained within the perimeter of the roll cage.

3. The pressure washer of claim 1, wherein the roll cage includes:

an additional handle that extends from the front end face to the rear end face and is parallel with the two top bars.

4. The pressure washer of claim 3, further comprising:

a hose, wherein an outer perimeter of a top surface of the main housing has a heightened wall that creates a well at a center of the main housing for storing the hose, and when the hose is placed into the well of the main housing, the hose is secured in the well by the two top bars and the additional handle of the roll cage.

5. The pressure washer of claim 1, wherein the roll cage further includes brackets extending from the four corners of the front end face and the four corners of the rear end face to the main housing to secure the main housing to the roll cage.

6. The pressure washer of claim 1, further comprising:

a power cord, wherein the roll cage includes posts on a top surface, and wherein the power cord is to be wrapped around the posts on the roll cage for storage.

7. The pressure washer of claim 1, wherein the main housing is generally rectangular shaped.

8. The pressure washer of claim 7, wherein the main housing includes a storage compartment for holding accessories of the pressure washer.

9. A pressure washer comprising:

a main housing holding a motor and a pump and including a storage compartment for holding accessories for the pressure washer; and a roll cage surrounding all sides of the main housing, the roll cage having a series of bars that define generally planar open surfaces, wherein the roll cage includes:

a front end face having four corners, a rear end face having four corners, two top bars connecting two top corners of the front end face and two top corners of the rear end face, two bottom bars connecting two bottom corners of the front end face and two bottom corners of the rear end face, a pair wheels attached to the two bottom corners of the rear end face, and an extendable handle attached to the two bottom corners of the front end face and inserted inside the two bottom bars, wherein, when the extendable handle is retracted into the two bottom bars, a cross bar of the extendable handle forms a bottom edge of the front end face, and when the extendable handle is extended from the two bottom bars, the extendable handle allows the pressure washer to be pulled and rolled on the pair of wheels that are attached to the two bottom corners of the rear end face.

10. The pressure washer of claim 9, further comprising: a hose, wherein the roll cage includes an additional handle that extends from the front end face to the rear end face and is parallel with the two top bars, and wherein an outer perimeter of a top surface of the main housing has a heightened wall that creates a well at a center of the main housing for storing the hose, and when the hose is placed into the well of the main housing, the hose is secured in the well by the two top bars and the additional handle of the roll cage.

11. The pressure washer of claim 9, wherein the roll cage is generally cuboid shaped and the main housing is generally cuboid shaped, and wherein the roll cage further includes brackets extending from the four corners of the front end face and the four corners of the rear end face to the main housing to secure the main housing to the roll cage.

* * * * *